(12) United States Patent
Dollase et al.

(10) Patent No.: US 10,793,751 B2
(45) Date of Patent: Oct. 6, 2020

(54) PRESSURE-SENSITIVE ADHESIVE, AND SELF-ADHESIVE PRODUCTS AND COMPOSITES COMPRISING THE LATTER

(71) Applicant: TESA SE, Norderstedt (DE)

(72) Inventors: Thilo Dollase, Hamburg (DE); Gregor Osterwinter, Hamburg (DE)

(73) Assignee: TESA SE, Norderstedt (DE)

( * ) Notice: Subject to any disclaimer, the term of this patent is extended or adjusted under 35 U.S.C. 154(b) by 41 days.

(21) Appl. No.: 16/070,149

(22) PCT Filed: Feb. 7, 2017

(86) PCT No.: PCT/EP2017/052617
§ 371 (c)(1),
(2) Date: Jul. 13, 2018

(87) PCT Pub. No.: WO2017/137386
PCT Pub. Date: Aug. 17, 2017

(65) Prior Publication Data
US 2019/0040285 A1  Feb. 7, 2019

(30) Foreign Application Priority Data
Feb. 10, 2016  (DE) .................. 10 2016 202 018

(51) Int. Cl.
| | |
|---|---|
| C09J 153/02 | (2006.01) |
| C08L 53/02 | (2006.01) |
| C08F 212/08 | (2006.01) |
| C08F 236/06 | (2006.01) |
| C08F 236/08 | (2006.01) |
| C08K 5/00 | (2006.01) |
| C09J 7/38 | (2018.01) |
| C08L 91/00 | (2006.01) |
| C09J 7/10 | (2018.01) |
| C09J 11/08 | (2006.01) |

(52) U.S. Cl.
CPC ............ *C09J 7/387* (2018.01); *C08F 212/08* (2013.01); *C08F 236/06* (2013.01); *C08F 236/08* (2013.01); *C08K 5/0016* (2013.01); *C08L 53/02* (2013.01); *C08L 91/00* (2013.01); *C09J 7/10* (2018.01); *C09J 11/08* (2013.01); *C09J 153/02* (2013.01); *C08F 2500/01* (2013.01); *C08F 2800/20* (2013.01); *C08L 2205/03* (2013.01)

(58) Field of Classification Search
CPC ...... C09J 7/387; C09J 153/02; C09J 153/025; C08L 53/02; C08L 53/025; C08L 2205/03
See application file for complete search history.

(56) References Cited

U.S. PATENT DOCUMENTS

| | | |
|---|---|---|
| 4,163,764 A | 8/1979 | Nash |
| 4,944,994 A | 7/1990 | Flanagan |
| 5,183,705 A | 2/1993 | Birkholz et al. |
| 5,372,870 A | 12/1994 | Diehl et al. |
| 5,523,343 A | 6/1996 | Giordano et al. |
| 5,668,208 A | 9/1997 | Viola et al. |
| 7,906,583 B2 | 3/2011 | Lechat et al. |
| 2011/0284156 A1* | 11/2011 | Prenzel ................ B05D 1/286 156/256 |
| 2014/0024513 A1* | 1/2014 | Robert ................. C09J 153/02 493/331 |
| 2015/0337177 A1* | 11/2015 | Krawinkel .............. C09J 7/22 428/337 |
| 2015/0368521 A1 | 12/2015 | Einsla et al. |
| 2016/0068722 A1* | 3/2016 | Schmitz-Stapela ...... C09J 7/387 428/521 |
| 2016/0333235 A1 | 11/2016 | Nakatani et al. |
| 2016/0340501 A1* | 11/2016 | Miyazaki ............. B60C 1/0016 |
| 2019/0105937 A1* | 4/2019 | Ichihashi ............... B41N 1/12 |

FOREIGN PATENT DOCUMENTS

| | | |
|---|---|---|
| DE | 102012212879 A1 | 1/2014 |
| DE | 102012223670 A1 | 6/2014 |

(Continued)

OTHER PUBLICATIONS

German Search Report for corresponding application DE 10 2016 202 018.8 dated Sep. 15, 2016.
English translation of the International Search Report for corresponding application PCT/EP2017/052617 dated May 4, 2017.
International Search Report and Written Opinion of the International Searching Authority for corresponding application PCT/EP2017/052617 dated May 4, 2017.
TW Office Action for corresponding application TW 106104268 dated Jul. 3, 2018.

*Primary Examiner* — Jeffrey C Mullis
(74) *Attorney, Agent, or Firm* — Norris McLaughlin PA (57) ABSTRACT

The invention relates to a block copolymer-containing pressure-sensitive adhesive comprising e) 52% by weight to 65% by weight, preferably 55% by weight to 62% by weight, of an elastomer component, f) 30% by weight to 45% by weight, preferably 35% by weight to 42% by weight, of at least one bonding resin, g) 0% by weight to 15% by weight, preferably to 10% by weight, of at least one softening resin and h) 0% by weight to 18% by weight, preferably to 10% by weight, of further additives, where the elastomer component (a) consists to an extent of at least 90% by weight of polyvinylaromatic-polybutadiene block copolymers, where the polyvinylaromatic-polybutadiene block copolymers include at least one type of diblock copolymer (a1) and at least one type of tri- or multiblock copolymer (a2), the at least one diblock copolymer (a1) has a vinylaromatic content of 15% by weight to 45% by weight, within the elastomer component (a) the proportion of tri- or multiblock copolymer (a2) is between 25% by weight and 50% by weight, preferably between 30% by weight and 45% by weight, the tri- or multiblock copolymer (a2) has a molar mass of at least 125 000 g/mol and a vinylaromatic content of 15% to 45% by weight, and one kind of the tri- or multiblock copolymer is preferably a multi-arm (radial) block copolymer.

18 Claims, 1 Drawing Sheet

(56) References Cited

FOREIGN PATENT DOCUMENTS

| | | |
|---|---|---|
| DE | 102013205673 A1 | 10/2014 |
| EP | 0615433 B1 | 9/1994 |
| EP | 1013733 A1 | 12/1999 |
| EP | 1308492 B1 | 5/2003 |
| EP | 1564273 A1 | 8/2005 |
| JP | 4847515 B2 | 12/2011 |
| TW | 201534677 A | 9/2015 |
| WO | 9823229 A1 | 6/1998 |
| WO | 0024840 A1 | 5/2000 |
| WO | 2008110685 A1 | 9/2008 |
| WO | 2009114683 A1 | 9/2009 |
| WO | 2010077541 A1 | 7/2010 |
| WO | 2010078396 A2 | 7/2010 |
| WO | 2011124782 A1 | 10/2011 |
| WO | 2014198150 A1 | 12/2014 |

* cited by examiner

PRESSURE-SENSITIVE ADHESIVE, AND SELF-ADHESIVE PRODUCTS AND COMPOSITES COMPRISING THE LATTER

This is an application filed under 35 USC 371 based on PCT/EP2017/052617, filed 7, Feb. 2018, which in turn is based on DE 10 2016 202 018.8, filed 10, Feb. 2016. The present application claims the full priority benefit of these prior applications.

The invention relates to a pressure-sensitive adhesive, and to assemblies and self-adhesive products comprising it.

Synthetic rubber based pressure-sensitive adhesives which comprise styrene block copolymers are well known and are employed in diverse applications. Advantages of this kind of pressure-sensitive adhesives (PSAs) are the high bond strengths to substrates with different surface energies and especially as well to low surface energy ("LSE") substrates. At the same time they impress with very high holding power under typical ambient conditions.

Modern applications in the field of the bonding of components in mobile devices, which can be produced by self-adhesive products, require not only a combination of high bond strength and holding power but also high thermal shear strength and shock resistance. Here there is always a further improvement in performance desired for typical synthetic rubber based formulations. High bond strengths are typically achieved by admixing a synthetic rubber with a relatively high fraction of tackifier resin(s). Certain of these applications additionally require the possibility for an adhesive bond to be undone again after a certain bonding time. For every formulation approach, any consequent effects on the processing characteristics must be borne in mind. For solvent-free processing techniques such as hotmelt coating, in particular, it is therefore necessary to take account of the rheological behavior of the formulation in the melt, with possible restrictions on formulation freedom.

The term "mobile devices" embraces, for example, devices of the consumer electronics industry, including electronic, optical, and precision-mechanical devices, and more particularly, for the purposes of the present specification, devices of the kind classified in Class 9 of the International Classification of Goods and Services for the Registration of Marks (Nice Classification), 10$^{th}$ edition (NCL (10-2013)), to the extent that they are electronic, optical or precision-mechanical devices, and also clocks and chronometers as per Class 14 (NCL (10-2013)), such as, in particular scientific, marine, metrological, photographic, film, optical, weighing, measuring, signaling, monitoring, rescuing, and instruction apparatus and instruments;

apparatus and instruments for conducting, switching, transforming, storing, regulating, and monitoring electricity;

image recording, processing, transmission and reproduction devices, such as televisions and the like acoustic recording, processing, transmission, and reproduction devices, such as broadcasting devices and the like computers, calculating instruments, and data-processing devices, mathematical devices and instruments, computer accessories, office instruments—for example, printers, faxes, copiers, word processors—, data storage devices telecommunications devices and multifunctional devices with a telecommunications function, such as telephones and answering machines chemical and physical measuring devices, control devices, and instruments, such as battery chargers, multimeters, lamps, and tachometers nautical devices and instruments optical devices and instruments medical devices and instruments and those for sports persons clocks and chronometers solar cell modules, such as electrochemical dye solar cells, organic solar cells, thin-film cells, fire-extinguishing equipment.

Technical development is going increasingly in the direction of devices which are ever smaller and lighter in design, allowing them to be carried at all times by their owner and typically being regularly carried. This development is typically accomplished by realization of low weights and/or suitable size of such devices. Devices of these kinds are referred to for the purposes of this specification as mobile devices or portable devices. Within this development trend, precision-mechanical and optical devices are increasingly being provided (also) with electronic components, thereby raising the possibilities for minimization. Because the mobile devices are carried, they are subject to increased exposures—especially mechanical exposures—through, for instance, impacts on edges, by being dropped, by contact with other hard objects in a pocket or bag, or else simply by the permanent motion involved in being carried per se. Mobile devices, however, are also subject to a greater extent to exposures as a consequence of moisture activity, temperature influences and the like, by comparison with those "immobile" devices which are typically installed in interior spaces and which move little or not at all.

For such devices there is a requirement in particular for adhesive tapes which possess a high holding power and which can be easily removed at will. Many applications, moreover, require high strength even at elevated temperatures.

Furthermore, however, it is especially important that the adhesive tapes do not fail in their holding power when the mobile device—a cellphone, for example—is dropped and hits the ground. The adhesive strip or the bonded assembly must therefore display very high shock resistance.

PSAs based on styrene block copolymers are among the conventional families of adhesive that are employed in self-adhesive products. A series of technological aspects relating to such PSAs are described for example in D. Satas (F. C. Jagisch, J. M. Tancrede in Handbook of Pressure Sensitive Adhesive Technology, D. Satas (ed.), 3$^{rd}$ edn., 1999, Satas & Associates, Warwick, R.I., chapter 16). The presentation includes various block copolymer architectures, also including multiarm (radial) structures, which are able to exert a positive influence on the viscosity properties of the adhesive formulation particularly with a view to (hotmelt) processability. It is also possible to improve the thermal shear strength by comparison with a linear block copolymer, as shown using the example of a polystyrene-polyisoprene system. The prior art has further formulations which comprise radial block copolymers. They include formulations which no longer or often utilize (in some cases significantly) less than 50 wt % of the elastomer portion comprising the radial block copolymer (WO 2008/073669 A1; U.S. Pat. No. 4,944,994 A1; U.S. Pat. Nos. 5,668,208 A; 5,372,870 A1; EP 0 991 376 A1; EP 1 013 733 A1).

EP 0 615 433 B1 describes hotmelt adhesive formulations which include 15 to 25 wt % of a radial block copolymer having a molar mass of at least 160 000 g/mol. Also included are 30 to 70 wt % of a tackifier resin and 10 to 40 wt % of a plasticizing oil. Specified formulations consistently have a total elastomer content of below 40 wt %.

U.S. Pat. No. 7,906,583 B2 teaches mixtures comprising an elastomer mixture which includes a radial styrene block copolymer. The elastomer portion consists to an extent of 10 to 55 wt % of radial block copolymer and to an extent of 90 to 45 wt % of a diblock copolymer. The soft blocks of the radial block copolymer are composed of polyisoprene and polybutadiene segments. The fraction of diblock copolymer in the elastomer fraction is preferably at least 60 wt % or more. The tackifier resin fraction may be at least 50 wt %. Moreover, there is customarily between 5 and 20 wt % of a plasticizing oil included. Examples give formulations with 31 wt % of elastomer, 27 wt % of plasticizing resin, and 42 wt % of tackifier resin. For corresponding adhesive formulations, an advantageous diecutting behavior is emphasized.

WO 2000/024840 A1 teaches PSA formulations comprising a diblock copolymer and a triblock or multiblock copolymer. The fraction of triblock or multiblock copolymer in relation to the elastomer portion is 5 wt % to 60 wt %. The elastomer portion within the total formulation amounts to 25 wt % to 65 wt %. 35 wt % to 50 wt % is emphasized as being particularly advantageous. Examples consistently state formulations with well below 50 wt % elastomer fraction. For corresponding PSAs, particularly good bonding performance on nonpolar substrates is emphasized. Shock resistance is not addressed.

U.S. Pat. No. 5,523,343 A1 describes hotmelt adhesive formulations which include radial block copolymers. The fraction of elastomers in the formulation is between 20 wt % and 65 wt %, and more particularly below 50 wt %. It is highlighted as being particularly advantageous for the elastomer fraction and the fraction of tackifier resin to be the same or there is a greater quantity of tackifier resin(s) present than elastomers. Advantages of a formulation in which the elastomer portion represents the majority component relative to the resin component are not emphasized.

U.S. Pat. No. 5,183,705 A1 teaches pressure-sensitive adhesive formulations which include a radial block copolymer. Examples specify elastomer fractions in the overall formula of below 50 wt %. Formulations include plasticizing oil. The specification does not disclose the planned employment of further (nonradial) block copolymers additionally to the radial block copolymer. In particular, no usage ratio of the radial block copolymer within the elastomer portion is specified.

U.S. Pat. No. 4,163,764 A1 discloses exemplary adhesive formulations which include a radial block copolymer. The fraction of radial block copolymer in the formulation can be between about 30 wt % and about 70 wt %. The specification does not disclose the planned employment of further (nonradial) block copolymers additionally to the radial block copolymer. In particular, no usage ratio of the radial block copolymer within the elastomer portion is specified.

EP 1 564 273 A1 describes hotmelt adhesive formulations comprising a radial block copolymer, a linear block copolymer, a tackifier resin, and a plasticizer. The radial block copolymer is included at less than 15 wt %, the linear block copolymer at not more than 20 wt %.

The object is to create a solution for PSAs which combine high bond strength with high thermal shear strength and high shock resistance. Such PSAs would be particularly suitable for self-adhesive products that could be used to realize bonded assemblies particularly in mobile devices with high shock resistance. Also sought are PSAs which in addition to the combination of high thermal shear strength, high bond strength, and high shock resistance, additionally exhibit good tear resistance, so that a self-adhesive product comprising this layer of PSA can be parted from a bonded assembly substantially without destruction or residue by extensive stretching.

The invention accordingly relates to a block copolymer-containing pressure-sensitive adhesive comprising a) 52 wt % to 65 wt %, preferably 55 wt % to 62 wt %, of an elastomer component, b) 30 wt % to 45 wt %, preferably 35 wt % to 42 wt %, of at least one tackifier resin, c) 0 wt % to 15 wt %, preferably up to 10 wt %, of at least one plasticizing resin, and d) 0 wt % to 18 wt %, preferably up to 10 wt %, of further additives, wherein the elastomer component (a) consists to an extent of at least 90 wt % of polyvinylaromatic-polybutadiene block copolymers, the polyvinylaromatic-polybutadiene block copolymers comprising at least one kind of a diblock copolymer (a1) and at least one kind of a triblock or multiblock copolymer (a2).

The one kind of the triblock or multiblock copolymer is preferably a multiarm (radial) block copolymer.

A pressure-sensitive adhesive (PSA) is an adhesive which under just relatively weak applied pressure allows a permanent connection to be formed to virtually all substrates and which after use can be detached from the substrate again substantially without residue. A PSA at room temperature is permanently adhesive, thus having a sufficiently low viscosity and a high tack, so that it wets the surface of the respective bond substrate under just low applied pressure. The bondability of the adhesive derives from its adhesive properties, and the redetachability from its cohesive properties.

The at least one diblock copolymer (a1) has a vinylaromatic fraction of 15 wt % to 45 wt %. Diblock copolymer (a1) preferably further has a molar mass of at least 80 000 g/mol or a vinylaromatic fraction of 20 wt % to 40 wt %.

With further preference the molar mass is at least 80 000 g/mol and the vinylaromatic fraction is 20 wt % to 40 wt %.

The at least one triblock or multiblock copolymer (a2), preferably multiarm (radial) block copolymer, has a molar mass of at least 125 000 g/mol and a vinylaromatic fraction of 15 wt % to 45 wt %.

Preferably the molar mass is at least 150 000 g/mol or the vinylaromatic fraction is 20 wt % to 40 wt %.

With further preference the molar mass is at least 150 000 g/mol and the vinylaromatic fraction is 20 wt % to 40 wt %.

According to one preferred embodiment, the at least one diblock copolymer (a1) and the at least one triblock or multiblock copolymer (a2) are simultaneously selected as specified above.

Within the elastomer portion (a), the fraction of triblock or multiblock copolymer (a2) is between 25 wt % and 50 wt %, preferably between 30 wt % and 45 wt %. Too high a fraction of high molecular mass block copolymer leads to a decrease in the bond strength. Moreover, processability is also found to be more difficult (for example, coating, particularly in a solvent-free procedure). Too low a fraction, in contrast, results in inadequate thermal shear strength.

The remaining fraction of the elastomer portion (a) comprises the at least one diblock copolymer (a1), but advantageously may additionally include a further polyvinylaromatic-polybutadiene block copolymer (a3), which in the crude state has a tensile strength of at least 25 MPa (according to ISO 37) and a molar mass of at most 120 000 g/mol.

If a block copolymer (a3) is employed, the fraction within the elastomer portion (a) is preferably at most 35 wt %, more preferably at most 25 wt %.

The addition of the block copolymer (a3) leads to an increase in the tear strength, this being important particularly for the parting of the bond by extensive stretching. Too high a fraction, however, leads to a lowering of the thermal shear strength and of the shock resistance.

The at least one diblock copolymer (a1) is therefore included at 75 wt % to 5 wt % in the elastomer portion (a).

The usage ratio of elastomer component (a) to resin component [(b)+(c)] is preferably 1.20:1.00 to 2.00:1.00, preferably 1.35:1.00 to 1.80:1.00, more preferably 1.50:1.00 to 1.75:1.00. It has emerged, indeed, that the shock resistance requirement can be met particularly effectively if within the PSA formulation, the elastomer component (a) represents the majority component relative to the resin component [(b)+(c)]. The usage ratio of tackifier resin component (b) in resin component [(b)+(c)] is preferably at least 70 wt %, more preferably at least 80 wt %, to 100 wt %. Too high a plasticizing resin fraction leads to a reduction in the thermal shear strength.

The invention further provides self-adhesive products which comprise at least one layer of such a PSA.

The invention further provides self-adhesive products which comprise at least one layer of such a PSA and can be parted from a bond substantially without residue by extensive stretching.

Adhesives of the invention fulfill the shock resistance and bond strength criteria listed in the requirements catalog below. With preference, adhesives of the invention fulfill all three criteria from the requirements catalog below:

| Requirement | Property | Performance | Test method |
|---|---|---|---|
| Bond strength | Peel adhesion (steel) | ≥5.0 N/cm, preferably ≥6.5 N/cm, very preferably ≥8.0 N/cm | Test I |
| Thermal shear strength | SAFT | ≥135° C., preferably ≥140° C., very preferably ≥145° C. | Test II |
| Shock resistance | Ball Drop | ≥180 cm, preferably ≥220 cm, very preferably ≥250 cm | Test III |

Elastomer Component (a)

Employed as elastomer component (block copolymer component) are in total, to an extent of at least 90 wt %, at least one kind of a diblock copolymer (a1) and at least one kind of a triblock or multiblock copolymer (a2), more particularly a multiarm (radial) block copolymer. Optionally employed additionally is a further kind of a block copolymer (a3). Independently of one another, (a1), (a2), and (a3) are polybutadiene-polyvinylaromatic block copolymers or a mixture of different polybutadiene-polyvinylaromatic block copolymers. This polybutadiene-polyvinylaromatic block copolymer or these polybutadiene-polyvinylaromatic block copolymers are copolymers comprising polymer blocks predominantly formed of vinylaromatics (A blocks), preferably styrene, and those predominantly formed by polymerization of 1,3-butadiene (B blocks). Polybutadiene block copolymers (SBS) are preferred in the sense of this invention because of their greater stability toward external influences such as ozone, for example, by comparison with polyisoprene block copolymers (SIS). By means of SBS polymers it is also possible to meet the stated requirements more effectively than with SIS polymers. On a supplementary basis, however, SIS polymers can also be used. Selected for the present invention are polybutadiene-polyvinylaromatic block copolymers which, as known to the skilled person from the prior art, in the crude state develop a multiple-(two)phase morphology.

The elastomer mixture (a) comprises, accordingly, at least one polybutadiene-polyvinylaromatic block copolymer consisting of an A block and a B block, referred to as the diblock copolymer (a1). Diblock copolymers contribute to tack and flowout of the adhesive. Diblock copolymers contain free chain ends for the B blocks, a factor which can be assumed to be important for the shock resistance. The fraction of vinylaromatics in the diblock copolymers is between 20 wt % to 45 wt %, preferably between 25 wt % to 40 wt %. The molar mass of the diblock copolymer is preferably at least 80 000 g/mol.

The elastomer component (a) further comprises a triblock copolymer or a higher multiblock copolymer (a2), preferably a multiarm (radial) block copolymer having at least two A blocks and at least one B block. Here again, A blocks are formed of polyvinylaromatics and B blocks of polybutadiene. This block copolymer has the general structure A-B-A, $(A-B)_n$, $(A-B)_nX$ or $(A-B-A)_nX$, in which
the blocks A independently of one another are a polymer formed by polymerization of at least one vinylaromatic;
the blocks B independently of one another are a polymer formed by polymerization of butadiene, or are a partially hydrogenated derivative of such a polymer;
X is the radical of a coupling reagent or initiator; and
n is an integer ≥2, more particularly 3 or 4.

Employable with particular advantage are block copolymers of radial architecture and also star-shaped and linear multiblock copolymers.

Triblock and multiblock copolymers, and especially multiarm (radial) block copolymers, contribute to cohesion and tensile strength of the adhesive and also to the thermal shear strength. The fraction of vinylaromatics in the triblock or multilblock copolymers (a2) is between 20 wt % to 45 wt %, preferably from 25 wt % to 40 wt %. The molar mass of the triblock or multiblock copolymer is at least 125 000 g/mol, preferably at least 150 000 g/mol. By using block copolymers of the kind (a2) it is possible, surprisingly, to improve the shock resistance. If the molar mass is too low, the shock resistance requirement is unattainable.

The elastomer component (a) optionally further comprises a triblock copolymer (a3) having two A blocks and one B block, with a resulting A-B-A structure. This is likewise a polybutadiene-polyvinylaromatic block copolymer. This block copolymer in the crude state has a tensile strength of at least 25 MPa (determined according to ISO 37) and a molar mass of not more than 120 000 g/mol. The fraction of vinylaromatics in the triblock copolymer (a3) is 25 wt % to 45 wt %. By way of the triblock copolymer (a3) it is possible to control the tensile strength of the formulation, this being advantageous particularly in the case of certain product designs (especially transfer tapes) for which parting from a bonded assembly substantially without residue by means of extensive stretching is desired.

It is possible to use a plurality of different diblock copolymers. It is possible to use a plurality of triblock and/or multiblock copolymers. The total block copolymer content or elastomer fraction (a) in the adhesive is at least 52 wt % and at most 65 wt %, preferably at least 55 wt % and at most 62 wt %. Significantly lower fractions of elastomer lead to insufficient cohesion, which may manifest itself in reduced thermal shear strength and/or reduced tear strength during the process of detachment carried out with extensive stretching, and also to a reduction in the shock resistance. Significantly higher fractions of elastomer lead to a drop in bonding strength.

The fraction of vinylaromatic block in the block copolymers may be different from one kind of block copolymer to another in the formulation, but is typically at least 20 wt % to 45 wt %, preferably from 25 wt % to 40 wt %. Too small a polyvinylaromatic fraction leads to inadequate physical crosslinking, created by microphase separation in the polybutadiene block copolymers. The physical crosslinking is important for the thermal shear strength and the tear strength. If the polyvinylaromatic fraction is too high, conversely, the adhesive loses adhesiveness. Vinylaromatics which are not part of block copolymers are preferably present to an extent of at most about 5 wt % in formulations of the invention. Formulations of the invention more particularly are substantially free of polyvinylaromatics which are not part of block copolymers.

The block copolymers of the PSAs preferably possess polystyrene end blocks as A blocks. In place of the preferred polystyrene blocks it is also possible as vinylaromatics to utilize polymer blocks based on other aromatic-containing homopolymers and copolymers (preferably $C_8$ to $C_{12}$ aromatics), such as, for example, α-methylstyrene-containing aromatic blocks. Moreover, identical or different A blocks may also be included.

A blocks are also referred to in the context of this invention as "hard blocks". B blocks, correspondingly, are also called "soft blocks" or "elastomer blocks". This reflects the selection of the blocks, in accordance with the invention, according to their glass transition temperatures (for A blocks at least 40° C., more particularly at least 60° C., and for B blocks up to at most −50° C., more particularly at most −80° C.). These FIGURES refer to the pure, unblended block copolymers and may be determined by means for example of DSC (Test IV).

The block copolymers resulting from the A and B blocks may comprise identical or different B blocks, in relation to microstructure (relative ratio of the types of monomer linkage possible for polybutadiene 1,4-cis, 1,4-trans, and 1,2-vinyl; preference is given to a 1,4 fraction (cis+trans) of >75 mol %, very preferably >85 mol %, based on the polybutadiene blocks, and to a 1,4-cis fraction of >40 mol %, based on the polybutadiene blocks) and/or chain length. A high fraction of 1,4 linkage and especially 1,4-cis linkage of the monomer units in the polybutadiene blocks leads to advantageous tension/extension characteristics, so resulting in sufficient extensibility, which is important in particular for the residue-free redetachment under extension. Moreover, the glass transition temperature of the soft blocks thus designed is advantageously low, to allow good shock resistance to be achieved. The 1,2 units may be hydrogenated. Advantageously, the 1,4 units are substantially not hydrogenated.

Commercially available block copolymer products frequently exhibit a combination of polymers with different architectures. Thus, for example, Kraton D1101, nominally a linear polystyrene-polybutadiene triblock copolymer, includes according to manufacturer information (The Global Connection for Polymer and Compound Solution Product and Application Guide, Kraton Performance Polymers, 2011) 16 wt % of a diblock copolymer. Kraton D1118, in contrast, another polystyrene-polybutadiene block copolymer, includes 78 wt % of a diblock copolymer. The FIGURES given above for the molar mass of the block copolymers relate in each case to the polymer mode which a skilled person is able to assign to the block copolymer architecture identified in the corresponding connection. FIGURES for the molar mass in this context should be understood as peak molar mass. GPC (Test VI) typically allows a finding to be made of the molar mass of the individual polymer modes in a mixture of different block copolymers. The FIGURES for fractions of block copolymer (a2) in the elastomer component (a) result from the composition (diblock relative to linear and/or radial block copolymer of higher molecular mass) of the type of elastomer used. Kraton D1118, for example, in accordance with the numerical values given above, contributes to an extent of 78 wt % to the block copolymer component (a1) and to an extent of 22 wt % to the block copolymer component (a2).

Tackifier Resin Component (b)

Tackifier resins are specific compounds having by comparison with the elastomers—a low molar mass, typically with a weight-average molecular weight (Test VII) MW<5000 g/mol. The weight-average molecular weight is customarily from 500 to 5000 g/mol, preferably from 500 to 2000 g/mol. The at least one tackifier resin has a DACP (according to Test VI) of at least about +5° C. and at most about +50° C., preferably of at most about +45° C., and also an MMAP (according to Test VI) of at least about +50° C. and at most about +85° C., preferably of at most about +80° C. For tackifier resins selected accordingly, compatibility with the polybutadiene blocks and incompatibility with polyvinylaromatic blocks is anticipated to an extent favorable for the purposes of this invention. The tackifier resin has a resin softening temperature (according to Test VIII) of at least about +90° C., preferably of at least about +110° C., and at most +140° C., preferably at most +120° C. The at least one tackifier resin used is advantageously a hydrocarbon resin.

Excessive polarity (DACP too low) leads to incipient compatibility with the vinylaromatic blocks, which can lead to a reduction in the cohesion and hence in the thermal shear strength. Insufficient polarity (DACP too high) leads to incompatibility of the tackifier resin with the soft block and hence to a loss of bond strength.

Excessive aromaticity (MMAP too low) leads to incipient compatibility with the vinylaromatic blocks, which can lead to a reduction in the cohesion and hence in the thermal shear strength. Insufficient aromaticity (MMAP too high) leads to incompatibility of the tackifier resin with the soft block and hence to a loss of bond strength.

The resins are selected preferably from the resin classes of the (partially) hydrogenated, aromatically modified $C_5$ resins, the polyterpene resins (prepared from α-pinene, β-pinene, δ-limonene or mixtures of these starting materials), the partially hydrogenated $C_9$ resins, the (partially) hydrogenated, aromatically modified α-pinene resins, the (partially) hydrogenated, aromatically modified β-pinene resins, the (partially) hydrogenated, aromatically modified δ-limonene resins, and the (partially) hydrogenated, aromatically modified dipentene resins. For the aromatic modification, styrene is preferred. Further tackifier resins are $C_9$-modified $C_5$ resins in their unhydrogenated, partially hydrogenated or fully hydrogenated form, and also $C_5$ resins in their unhydrogenated, partially hydrogenated or fully hydrogenated form. Polyterpene resins are preferred.

The fraction of tackifier resin(s) (b) in the PSA formulation affects the bond strength. The tackifier resin fraction ought therefore not to be too low. It has emerged, however, that too high a fraction of tackifier resin(s) has an adverse effect on the thermal shear strength and the shock resistance. The usage ratio of elastomer component (a) to resin component [(b)+(c)] is therefore, for the purposes of this invention, preferably 1.20:1.00 to 2.00:1.00, more preferably 1.35:1.00 to 1.80:1.00, more preferably still 1.50:1.00 to 1.75:1.00. The usage ratio of tackifier resin component (b) in resin component [(b)+(c)] is at least 70 wt %, preferably at least 80 wt %, to 100 wt %.

Plasticizing Resin Component (c)

The optionally employable plasticizing resin serves for the final fine-tuning of the cohesion/adhesion balance. Very preferably it comprises a plasticizing resin or plasticizing resin mixture with a melt viscosity at 25° C. and 1 Hz of at least 25 Pa*s, preferably of at least 50 Pa*s and a softening temperature of <25° C. The melt viscosity is determined according to Test IX. The plasticizing resin may be a rosin-based or, very preferably, a hydrocarbon-based plasticizing resin. The plasticizing resin or plasticizing resin mixture is employed, based on the overall adhesive formulation, with a fraction of 0 wt %, preferably of at least 2 wt % and at most 15 wt %, more preferably at most 10 wt %, based on the overall adhesive composition. Too high a fraction of plasticizing resin leads to a reduction in the cohesion, with adverse consequences for the thermal shear strength.

Typical plasticizers of low viscosity such as mineral oils are not advantageous in the sense of this invention, but may likewise be employed. In that case their fraction in the overall formula is preferably below 5 wt %, and very preferably no such plasticizers at all are used. A disadvantage of low-viscosity plasticizers is the risk of migration into layers that are in contact with the PSA layer.

Optional Further Constituents (d)

Stabilizers in particular can be added as further additives to the adhesive. They include aging stabilizers of primary and secondary types, light stabilizers and UV stabilizers, and also flame stabilizers (retardants), but also fillers, dyes, and pigments. The adhesive accordingly can be colored or white, gray or black.

Additives of these kinds, or other additives, that can customarily be utilized are as follows:

plasticizing agents such as, for example, plasticizer oils (formulations of the invention are preferably substantially free from plasticizer oils) or low molecular mass liquid polymers, such as low molecular mass polybutenes, for example, preferably with a fraction of 0.2 to below 5 wt %, based on the total weight of the PSA primary antioxidants such as, for example, sterically hindered phenols, preferably with a fraction of 0.2 to 1 wt %, based on the total weight of the PSA, secondary antioxidants, such as, for example, phosphites or thioethers, preferably with a fraction of 0.2 to 1 wt %, based on the total weight of the PSA, process stabilizers such as, for example, C radical scavengers, preferably with a fraction of 0.2 to 1 wt %, based on the total weight of the PSA, light stabilizers such as, for example, UV absorbers or sterically hindered amines, preferably with a fraction of 0.2 to 1 wt %, based on the total weight of the PSA, processing aids, preferably with a fraction of 0.2 to 1 wt %, based on the total weight of the PSA, endblock reinforcer resins, if desired preferably with a fraction of 0.2 to 10 wt %, based on the total weight of the PSA (very preferably formulations of the invention are substantially free from endblock reinforcer resins), and optionally further polymers, preferably elastomeric in nature; elastomers utilizable accordingly include, among others, those based on pure hydrocarbons, as for example unsaturated polydienes such as natural or synthetically generated polyisoprene and also polystyrene-polyisoprene block copolymers or polybutadiene, chemically substantially saturated elastomers such as, for example, saturated ethylene-propylene copolymers, α-olefine copolymers, polyisobutylene, butyl rubber, ethylene-propylene rubber, and also chemically functionalized hydrocarbons such as, for example, halogen-containing, acrylate-containing, allyl or vinyl ether-containing polyolefins, preferably with a fraction of 0.2 to 10 wt %, based on the total weight of the PSA.

The nature and amount of the blend components may be selected according to requirement.

Through the specific selection of the nature and amount of the block copolymers in the elastomer component (a), a boosting of the thermal shear strength is achieved in formulations of the invention. In the sense of this invention, therefore, it is possible advantageously to do without the use of what are called end block reinforcer resins, as is often proposed in the prior art as an approach for boosting thermal shear strength. Addition of endblock reinforcer resins customarily has an adverse effect on initial tackiness, tack and/or peel adhesion. The fraction of aromatic polymers as may be introduced into the formulation from the block copolymer raw materials, for example, is also at most about 5 wt %.

It is also of importance for the invention if the adhesive in each case does not have some or even all of the stated adjuvants.

One particularly advantageous formulation in the sense of the present invention comprises at least one diblock copolymer (a1), at least one triblock and/or multiblock copolymer (a2), at least one tackifying resin (b), but substantially no plasticizing resin (c), substantially no plasticizing oil, less than about 5 wt % of, preferably substantially no, vinylaromatic polymer not incorporated in a block copolymer, and substantially no endblock reinforcer resin.

Another particularly advantageous formulation in the sense of the present invention comprises at least one diblock copolymer (a1), at least one multiarm (radial) block copolymer (a2), at least one tackifying resin (b), but substantially no plasticizing resin (c), substantially no plasticizing oil, less than about 5 wt % of, preferably substantially no, vinylaromatic polymer not incorporated in a block copolymer, and substantially no endblock reinforcer resin.

A third particularly advantageous formulation in the sense of the present invention comprises at least one diblock copolymer (a1), at least one triblock and/or multiblock copolymer (a2), at least one tackifying resin (b), at least one plasticizing resin (c), but substantially no plasticizing oil, less than about 5 wt % of, preferably substantially no, vinylaromatic polymer not incorporated in a block copolymer, and substantially no endblock reinforcer resin.

A fourth particularly advantageous formulation in the sense of the present invention comprises at least one diblock copolymer (a1), at least one multiarm (radial) block copolymer (a2), at least one tackifying resin (b), at least one plasticizing resin (c), but substantially no plasticizing oil, less than about 5 wt % of, preferably substantially no, vinylaromatic polymer not incorporated in a block copolymer, and substantially no endblock reinforcer resin.

A fifth advantageous formulation in the sense of the present invention comprises at least one diblock copolymer (a1), at least one triblock and/or multiblock copolymer (a2), at least one block copolymer (a3), at least one tackifying resin (b), but substantially no plasticizing resin (c), substantially no plasticizing oil, less than about 5 wt % of, preferably substantially no, vinylaromatic polymer not incorporated in a block copolymer, and substantially no endblock reinforcer resin.

A sixth particularly advantageous formulation in the sense of the present invention comprises at least one diblock copolymer (a1), at least one multiarm (radial) block copolymer (a2), at least one block copolymer (a3), at least one tackifying resin (b), but substantially no plasticizing resin (c), substantially no plasticizing oil, less than about 5 wt % of, preferably substantially no, vinylaromatic polymer not incorporated in a block copolymer, and substantially no endblock reinforcer resin.

A seventh particularly advantageous formulation in the sense of the present invention comprises at least one diblock copolymer (a1), at least one triblock and/or multiblock copolymer (a2), at least one block copolymer (a3), at least one tackifying resin (b), at least one plasticizing resin (c), but substantially no plasticizing oil, less than about 5 wt % of, preferably substantially no, vinylaromatic polymer not incorporated in a block copolymer, and substantially no endblock reinforcer resin.

An eighth particularly advantageous formulation in the sense of the present invention comprises at least one diblock copolymer (a1), at least one multiarm (radial) block copolymer (a2), at least one block copolymer (a3), at least one tackifying resin (b), at least one plasticizing resin (c), but substantially no plasticizing oil, less than about 5 wt % of, preferably substantially no, vinylaromatic polymer not incorporated in a block copolymer, and substantially no endblock reinforcer resin.

The present invention proposes block copolymer-containing formulations for PSAs with good bond strength in conjunction with enhanced thermal shear strength and nevertheless improved shock resistance. They comprise a specifically well-balanced fraction of at least one high molecular mass triblock or multiblock copolymer, more particularly of a multiarm (radial) block copolymer.

The invention relates, moreover, to self-adhesive products which comprise at least one layer of a PSA of the invention. Adhesives of the invention are especially advantageous in self-adhesive products which can be extracted from a bond substantially without residue by extensive stretching, referred to as self-adhesive strips.

The invention also extends, lastly, to adhesively bonded assemblies which have been obtained by using self-adhesive products which comprise at least one layer of a PSA of the invention: an assembly composed of a pressure-sensitive adhesive strip and two components of a mobile device which are joined by the pressure-sensitive adhesive strip.

The formulations and the coatings and self-adhesive products generated from them can be produced using organic solvents or solventlessly.

A subject of the invention, accordingly, is the method for producing a layer of a pressure-sensitive adhesive formulation of the invention by shaping the sheetlike bonding agent comprising the PSA of the invention to form at least one layer having a layer thickness between 10 µm and 1500 µm, preferably between 25 µm and 800 µm. Example layer thicknesses generated via these methods are 50 µm, 75 µm, 100 µm, 150 µm, 200 µm, 250 µm, 400 µm, 500 µm, 600 µm and 700 µm.

In one favorable embodiment of the method of the invention, the pressure-sensitive adhesive layer is shaped by
first compounding the PSA of the invention solventlessly from the raw materials; this may take place, for example, batchwise in a kneading apparatus or internal mixer or continuously, for example, in a twin-screw extruder or planetary roller extruder,
bringing the compound (the PSA of the invention) by heating into a sufficiently soft state for it to be conveyable,
applying the PSA of the invention, in-line or off-line, to a substrate, the PSA being applied to form at least one layer having a layer thickness of greater than or equal to 10 µm and up to 1500 µm,
cooling the layer of PSA, and
obtaining a self-adhesive product or a self-adhesive product intermediate in accordance with the present invention.

In a favorable further embodiment of the method of the invention, the sheetlike bonding agent is shaped by
preparing a solution of the PSA of the invention in a solvent by dissolving or dispersing the raw materials,
applying the solution of the PSA of the invention to a substrate, the PSA being applied to form at least one layer having a weight per unit after drying of greater than or equal to 10 µm and up to 250 µm,
drying the layer of the solution of the PSA to remove a solvent, and
obtaining a self-adhesive product or a self-adhesive product intermediate in accordance with the present invention.

In the method of the invention the substrate is preferably a surface element, more particularly a carrier material, a film, a release liner, a transfer material and/or a cover material. Substrates may also be the surfaces of the production line in the manufacturing process. In that case a layer thickness of the PSA is processed to at least one layer of PSA of greater than or equal to 10 µm and the areally applied layer of PSA is optionally dried, and/or the solvents are removed. A solvent-free hotmelt adhesive is processed preferably.

To apply the PSA, the sheetlike elements used in accordance with the invention may be coated by methods including knife methods, nozzle knife methods, rolling rod die methods, extrusion die methods, casting nozzle methods, and caster methods. Other application methods that are in accordance with the invention include roll application methods, printing methods, screen-printing methods, patterned roll methods, inkjet methods, and spraying methods. Preference is given to hotmelt methods (extrusion, die).

Further layers or plies of material, optionally, are subsequently laminated on or coated in-line or off-line, and so multilayer/multi-ply production constructions can also be generated. In a further embodiment of the method of the invention, the resulting combination composed of sheetlike element and PSA is cut into by-the-meter product comprising tapes and/or is punched to form to diecuts, and the tapes are optionally wound up into a roll.

Formulations of the invention are employed in self-adhesive products. These self-adhesive products may take the form of an adhesion sheet, adhesive tape or adhesive diecut. The self-adhesive products comprise at least one layer of the formulation of the invention. This layer may have a layer thickness of between 10 µm and 1500 µm, preferably between 25 µm and 800 µm. Example layer thicknesses are 50 µm, 75 µm, 100 µm, 150 µm, 200 µm, 250 µm, 400 µm, 500 µm, 600 µm and 700 µm. The self-adhesive products may be unilaterally adhesive or double-sidedly adhesive. The qualities of the formulations of the invention can be utilized to particularly good effect in double-sided self-adhesive products if two components are to be bonded with one another and particularly in a mobile device.

Self-adhesive tapes produced using at least one PSA formulation of the invention may take the form of
- single-layer, double-sidedly self-adhesive tapes, known as "transfer tapes", composed of a single layer of a pressure-sensitive adhesive formulation of the invention;
- multilayer, double-sidedly self-adhesive tapes, in which the layers each consist of the PSAs of the invention or of one PSA of the invention and one noninventive PSA;
- double-sidedly self-adhesively furnished adhesive tapes with an intermediate carrier (what is known as a permanent carrier), which is disposed either in a layer of adhesive or between two layers of adhesive.

Preference is given to single-layer, double-sidedly self-adhesive products composed of a single layer of a PSA of the invention.

Preferred, moreover, is an embodiment of the self-adhesive product wherein the intermediate carrier consists only of a single layer of a polymer film.

In this case the double-sided products may have a symmetrical or an asymmetrical construction.

The concept of the invention embraces constructions having an extensible intermediate carrier within the self-adhesive product, more particularly in the middle of the sole layer of PSA, in which case the extensibility of the intermediate carrier must be sufficient to ensure detachment of the adhesive strip by extensive stretching. In this embodiment, a third block copolymer (a3), while it can be used, is nevertheless not necessary in every case. Accordingly, an embodiment of the invention comprises an extensible carrier and a layer of PSA with a composition which contains no block copolymer of kind (a3). Serving as intermediate carriers may be, for example, very extensive films. A maximum film extensibility of at least 250%, preferably of at least 400% (ISO 527-3), is advantageous. Examples of extensible intermediate carriers which can be used with advantage are transparent designs from WO 2011/124782 A1, DE 10 2012 223 670 A1, WO 2009/114683 A1, WO 2010/077541 A1, WO 2010/078396 A1.

The extensible intermediate carrier film is produced using film-forming or extrusible polymers, which may additionally be mono- or biaxially oriented.

One preferred version uses polyolefins. Preferred polyolefins are prepared from ethylene, propylene, butylene and/or hexylene, where in each case the pure monomers can be polymerized or mixtures of the stated monomers copolymerized. Through the polymerization process and through the selection of the monomers it is possible to control the physical and the mechanical properties of the polymer film such as, for example, the softening temperature and/or the tear strength.

Polyurethanes can be used advantageously, furthermore, as starting materials for extensible intermediate carrier layers. Polyolefins are chemically and/or physically crosslinked polycondensates which are synthesized typically from polyols and isocyanates. Depending on the nature and usage ratio of the individual components, extensible materials are obtainable which can be employed advantageously in the sense of this invention. Raw materials available to the formulator for this purpose are cited for example in EP 0 894 841 B1 and EP 1 308 492 B1. The skilled person is aware of further raw materials from which intermediate carrier layers of the invention can be constructed. It is advantageous, moreover, to employ rubber-based materials in intermediate carrier layers in order to realize extensibility. As rubber or synthetic rubber or blends generated therefrom, as starting material for extensible intermediate carrier layers, the natural rubber may be selected in principle from all available grades such as, for example, crepe, RSS, ADS, TSR or CV rubbers, according to requisite levels of purity and of viscosity, and the synthetic rubber or synthetic rubbers may be selected from the group of randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA), and polyurethanes and/or blends thereof. Employable with particular advantage as materials for extensible intermediate carrier layers are block copolymers. Individual polymer blocks in this case are linked covalently to one another. Block linkage may be present in a linear form, or else in a star-shaped or graft copolymer variant. One example of an advantageously employable block copolymer is a linear triblock copolymer whose two terminal blocks have a softening temperature of at least 40° C., preferably at least 70° C., and whose central block has a softening temperature of at most 0° C., preferably at most −30° C. Higher block copolymers, such as tetrablock copolymers, are likewise employable. It is important that there are at least two polymer blocks of identical or different kinds present in the block copolymer that have a softening temperature in each case of at least 40° C., preferably at least 70° C., and are separated from one another by at least one polymer block having a softening temperature of at most 0° C., preferably at most −30° C., in the polymer chain. Examples of polymer blocks are polyethers such as, for example, polyethylene glycol, polypropylene glycol or polytetrahydrofuran, polydienes, such as, for example, polybutadiene, or polyisoprene, hydrogenated polydienes, such as, for example, polyethylene-butylene or polyethylene-propylene, polyesters, such as polyethylene terephthalate, polybutanediol adipate or polyhexanediol adipate, for example, polycarbonate, polycaprolactone, polymer blocks of vinylaromatic monomers, such as polystyrene or poly-[α]-methylstyrene, for example, polyalkyl vinyl ethers, polyvinyl acetate, polymer blocks of [α],[β]-unsaturated esters such as, in particular, acrylates or methacrylates. The skilled person is aware of corresponding softening temperatures. Alternatively they can be looked up by the skilled person in, for example, the Polymer Handbook [J. Brandrup, E. H. Immergut, E. A. Grulke (eds.), Polymer Handbook, 4th edn. 1999, Wiley, New York]. Polymer blocks may be constructed from copolymers.

Here as well it may be appropriate, for producing an intermediate carrier material, to add additives and further components which improve the film-forming properties, which reduce the tendency to form crystalline segments and/or which specifically improve or else where appropriate, impair mechanical properties.

Also suitable are foam materials in web form (made of polyethylene and polyurethane, for example).

The intermediate carriers may have a multi-ply configuration.

Furthermore, the intermediate carriers may have outer layers, blocking layers for example, which prevent penetration of components from the adhesive into the intermediate carrier or vice versa. These outer layers may also have barrier properties, so as to prevent diffusive passage of water vapor and/or oxygen.

For improved anchorage of the PSAs on the intermediate carrier, the intermediate carriers may be pretreated by the known measures such as corona, plasma or flame. Utilization of a primer is also possible. Ideally, however, there is no need for pretreatment.

The reverse of the intermediate carrier may have been subject to an antiadhesive physical treatment or coating.

Further embraced with the concept of the invention are constructions with an intermediate carrier having a high modulus of elasticity and low extensibility within the self-adhesive product, more particularly in the middle of the sole layer of PSA, with the modulus of elasticity of the intermediate carrier being advantageously at least 750 MPa, preferably at least 1 GPa (ISO 527-3), and with the maximum extensibility (according to ISO 527-3) being at most 200%. Constructions of this kind can be employed particularly well in diecutting operations, and facilitate handling qualities in the application process. Permanent carriers of such design are also an advantage when the aim is to enable redetachment of the self-adhesive product by peeling. In this configuration, a third block copolymer (a3), while such may be used, is not necessary in every case. Accordingly, one configuration of the invention comprises a low-extensibility carrier and a layer of PSA with a composition which contains no block copolymer of the kind (a3).

To produce intermediate carrier films of this kind, film-forming or extrudable polymers are used, which in particular may additionally have been monoaxially or biaxially oriented. Particularly appropriate film material for the at least one ply of a film for this embodiment comprises polyester films, and here more preferably films based on polyethylene terephthalate (PET). Polyester films are preferably biaxially drawn. Also conceivable are films made of polyolefins, especially of polybutene, cycloolefin copolymer, polymethylpentene, polypropylene or polyethylene, as for example of monoaxially drawn polypropylene, biaxially drawn polypropylene, or biaxally drawn polyethylene. This recitation is intended to indicate examples; the skilled person is aware of further systems which are in line with the concept of the present invention.

Here as well it may be appropriate, for producing an intermediate carrier material, to add additives and further components which improve the film-forming properties, which reduce the tendency to form crystalline segments and/or which specifically improve or else where appropriate, impair mechanical properties.

The intermediate carriers may have a multi-ply configuration.

Furthermore, the intermediate carriers may have outer layers, blocking layers for example, which prevent penetration of components from the adhesive into the intermediate carrier or vice versa. These outer layers may also have barrier properties, so as to prevent diffusive passage of water vapor and/or oxygen.

For improved anchorage of the PSAs on the intermediate carrier, the intermediate carriers may be pretreated by the known measures such as corona, plasma or flame. Utilization of a primer is also possible. Ideally, however, there is no need for pretreatment.

The reverse of the intermediate carrier may have been subject to an antiadhesive physical treatment or coating.

The thickness of the intermediate carrier layer, irrespective of its extensibility, is in the range from 10 to 200 µm, preferably between 20 and 100 µm.

Finally, the self-adhesive product may also be covered on one or both sides with a liner, in other words with a temporary carrier, which has antiadhesive coating on one or both sides. A liner (release paper, release film) is not part of an adhesive tape, but instead is merely an aid to its production, its storage or its further processing by diecutting. Furthermore, in contrast to an adhesive tape carrier, a liner is not firmly joined to a layer of adhesive.

The invention, furthermore, relates with particular preference to mobile devices, since the adhesive used in accordance with the invention has a particular benefit here on account of its unexpectedly good properties (very high shock resistance). Listed below are a number of portable devices, without wishing the representatives specifically identified in this list to impose any unnecessary restriction with regard to the subject matter of the invention.

cameras, digital cameras, photographic accessories (such as light meters, flash guns, diaphragms, camera cases, lenses, etc.), film cameras, video cameras small computers (mobile computers, handheld computers, handheld calculators), laptops, notebook computers, netbooks, ultrabooks, tablet computers, handhelds, electronic diaries and organizers (known as "electronic organizers" or "personal digital assistants", PDAs, palmtops), modems, computer accessories and operator units for electronic devices, such as mice, drawing pads, graphics tablets, microphones, loudspeakers, games consoles, game pads, remote controls, remote operating devices, touchpads monitors, displays, screens, touch-sensitive screens (sensor screens, touchscreen devices), projectors reading devices for electronic books ("e-books"), mini TVs, pocket TVs, devices for playing films, video players radios (including mini and pocket radios), Walkmans, Discmans, music players for e.g. CD, DVD, Blu-ray, cassettes, USB, MP3, headphones cordless telephones, mobile phones, smartphones, two-way radios, hand-free telephones, devices for summoning people (pagers, bleepers)

mobile defibrillators, blood sugar meters, blood pressure monitors, step counters, pulse meters torches, laser pointers mobile detectors, optical magnifiers, long-range vision devices, night vision devices GPS devices, navigation devices, portable interface devices for satellite communication data storage devices (USB sticks, external hard drives, memory cards)

wristwatches, digital watches, pocket watches, fob watches, stopwatches.

Typical processed forms of the PSA of the invention are adhesive tape rolls and also adhesive strips, of the kind obtained in the form of diecuts, for example.

All layers preferably essentially have the form of a cuboid. With further preference, all layers are joined to one another over their full area.

The general expression "adhesive tape" in the sense of this invention encompasses all sheetlike structures such as two-dimensionally extended films or film sections, tapes with extended length and limited width, tape sections and the like, and lastly also diecuts or labels.

The adhesive tape therefore has a longitudinal extent and a lateral extent. The adhesive tape also has a thickness, extending perpendicularly to both extents, with the lateral extent and longitudinal extent being greater by a multiple than the thickness. The thickness is as far as possible the same, preferably exactly the same, over the entire areal extent of the adhesive tape as defined by length and width.

The adhesive tape more particularly is in web form. A web is interpreted as object whose length is greater by a multiple than the width and where the width is approximately preferably exactly the same along the entire length.

The adhesive tape may be produced in the form of a roll that is, in the form of an Archimedean spiral wound up onto itself.

Test Methods

All measurements were conducted, unless otherwise indicated, at 23° C. and 50% relative atmospheric humidity.

Test I—Bond Strength (Peel Adhesion)

The investigation takes place in a method based on PSTC-1. A strip 2 cm wide and 15 cm long of the adhesive tape specimen with a thickness of 50 μm is lined on one of its adhesive sides with a PET film 25 μm thick, and bonded by the other adhesive tape side to a polished steel plate (ASTM). A defined adhesive bond is ensured by rolling over the bond back and forth five times with a 4 kg roller. The plate is clamped in and the self-adhesive strip is peeled off via its free end on a tensile testing machine at a peel angle of 180° and a velocity of 300 mm/min. The test conditions are 23° C.+/−3° C./50%+/−5% relative humidity. The result reported is the average from three individual measurements, in N/cm.

Test II—Thermal Shear Strength (SAFT)

This test serves for accelerated testing of the shear strength of adhesive tapes under temperature load. For the test, the adhesive tape under investigation is adhered to a temperature-controllable steel plate, and loaded with a weight (50 g), and the distance of shear is recorded.
Sample Preparation:
The adhesive tape under investigation (50 μm transfer tape) is adhered by one of the adhesive sides to an aluminum foil 50 μm thick. The adhesive tape thus prepared is cut to a size of 10 mm*50 mm.
The cut-to-size adhesive tape sample is bonded by the other adhesive side to a polished steel test plate (material 1.4301, DIN EN 10088-2, surface 2R, surface roughness $R_a$=30 to 60 nm, dimensions 50 mm*13 mm*1.5 mm), cleaned with acetone, in such a way that the bond area of the sample in terms of height*width=13 mm*10 mm and the steel test plate protrudes by 2 mm at the top edge. The bond is then fixed by rolling a 2 kg steel roller over it six times at a speed of 10 m/min. At the top the sample is reinforced flush with a stable adhesive strip which serves as a support for the travel sensor. Using the steel plate, the sample is then suspended such that the adhesive tape end with the longer overhang points vertically downward.
Measurement:
The sample for measurement is loaded at the bottom end with a 50 g weight. The steel test plate with the bonded sample is heated to the final temperature of 200° C., beginning at 25° C., at a rate of 9 K/min.
The slip travel of the sample is observed using the travel sensor as a function of temperature and time. The maximum slip travel is set at 1000 μm (1 mm); if exceeded, the test is discontinued and the failure temperature is recorded. Test conditions: room temperature 23+/−3° C., relative humidity 50+/−5%. The result is the average value from two individual measurements and is reported in ° C.

Test III—Shock Resistance (Ball Drop)

This test provides information on the shock resistance of the sample specimens bonded with the adhesive tape of the invention and, respectively, with comparative samples, attributable to the shock absorption capacity of the adhesive tape. The test specimen used was a transfer tape 50 μm thick.

A square, frame-shaped sample was cut out of the double-sided adhesive tape under investigation (sample outside dimensions 33 mm×33 mm; border width 3.0 mm; inside dimensions (window opening) 27 mm×27 mm). This sample is adhered to an ABS frame (outside dimensions 50 mm×50 mm; border width 12.5 mm; inside dimensions (window opening) 25 mm×25 mm; thickness 3 mm). Adhered on the other side of the double-sided adhesive tape is a PMMA window of 35 mm×35 mm. ABS frame, adhesive tape frame and PMMA window are bonded in such a way that the geometric centers and the diagonals each lie above one another (corner to corner). The bond area is 360 mm2. The bond is pressed at 10 bar for 5 s and stored for 24 hours under conditions of 23° C./50% relative humidity.

Immediately after storage, the adhesive assembly composed of ABS frame, adhesive tape and PMMA sheet is placed with the protruding edges of the ABS frame onto a frame structure (sample holder) in such a way that the assembly is oriented horizontally and the PMMA sheet points downward, hanging freely. A steel ball (diameter 15 mm, mass 5.6 g) is dropped vertically from a height of 250 cm onto the sample thus arranged (through the window in the ABS frame), centered, onto the PMMA sheet (measuring conditions 23° C., 50% relative humidity). With each sample, three investigations are carried out, unless the PMMA sheet had become detached beforehand.

The ball drop test is deemed to be passed if the adhesive bond has not detached in any of the three investigations.

Test IV—Glass Transition Temperature (DSC)

Figure 1:
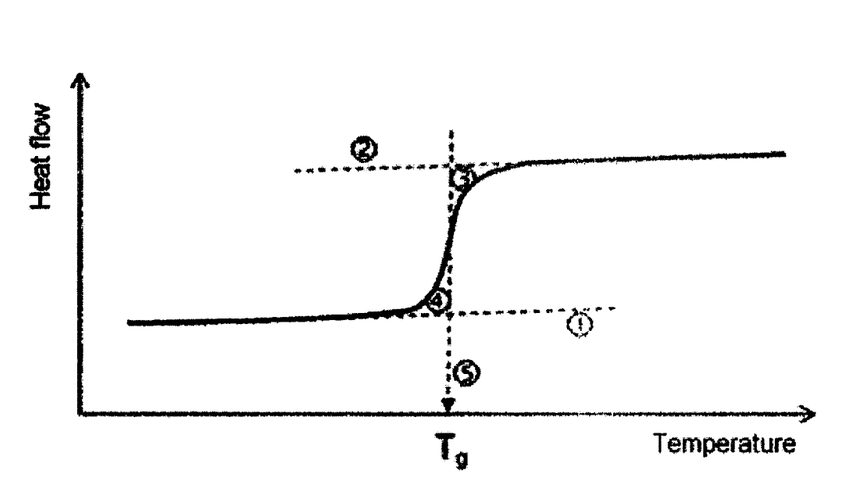
The FIGURE depicts thermogram illustrating a glass transition temperature.

The glass transition temperature of polymer blocks in block copolymers is determined by means of dynamic scanning calorimetry (DSC). For this purpose, approximately 5 mg of the untreated block copolymer samples are weighed into a small aluminum crucible (volume 25 μL) and the crucible is closed with a perforated lid. Measurement takes place using a DSC 204 F1 from Netzsch, operating under nitrogen for inertization. The sample is first cooled to −150° C., heated to +150° C. at a rate of 10 K/min, and again cooled to −150° C. The subsequent, second heating curve is run again at 10 K/min and the change in the feed capacity is recorded. Glass transitions are seem as steps in the thermogram. The glass transition temperature is evaluated as follows (in this regard, see the FIGURE). A tangent is applied to the baseline of the thermogram respectively before 1 and after 2 the step. A line 3 of best fit is placed parallel to the ordinate in the region of the step in such a way that it intersects the two tangents, in such a way as to form two areas 4 and 5 (between each of the tangents, the line of best fit and the measurement plot) of equal area. The point of intersection of the line of best fit thus positioned with the measurement plot gives the glass transition temperature.

Test V—Molar Mass (GPC)

(i) Peak Molar Mass of Individual Block Copolymer Modes
GPC is an appropriate technical measuring method for determining the molar mass of individual polymer modes in mixtures of different polymers. For the block copolymers which can be used for the purposes of this invention, prepared by living anionic polymerization, the molar mass distributions are typically narrow enough that polymer modes which can be assigned to triblock copolymers on the one hand and diblock copolymers on the other occur with sufficient resolution from one another in the elugram. The peak molar mass for the individual polymer modes can then be read off from the elugrams.

Peak molar masses MP are determined by means of gel permeation chromatography (GPC). The eluent used is THF. Measurement takes place at 23° C. The precolumn used is PSS-SDV, 5μ, $10^3$ Å ID 8.0×50 mm. Separation takes place using the columns PSS-SDV, 5μ, $10^3$ and also $10^4$ and $10^6$ each of ID 8.0×300 mm. The sample concentration is 4 g/l, the flow rate 1.0 ml per minute. Measurement is made against PS standards (μ=μm; 1 Å=$10^{-10}$ m).

(ii) Weight-Average Molar Mass Particularly of Tackifier Resins

The weight-average molecular weight $M_w$ is determined by means of gel permeation chromatography (GPC). The eluent used is THF. Measurement takes place at 23° C. The precolumn used is PSS-SDV, 5μ $10^3$ Å ID 8.0×50 mm. Separation takes place using the columns PSS-SDV, 5μ, $10^3$ and also $10^4$ and $10^6$ each of ID 8.0×300 mm. The sample concentration is 4 g/l, the flow rate 1.0 ml per minute. Measurement is made against PS standards (μ=μm; 1 Å= $10^{-10}$ m).

Test VI—Resin Compatibility (DACP)

The DACP is the diacetone alcohol cloud point and is determined by cooling a heated solution of 5 g of resin, 5 g of xylene and 5 g of diacetone alcohol to the point at which the solution becomes cloudy.

Regarding the determination of DACP values, reference is further made to C. Donker, PSTC Annual Technical Seminar, Proceedings, pp. 149-164, May 2001.

Test VII—Resin Compatibility (MMAP)

MMAP is the mixed methylcyclohexane-aniline cloud point, determined using a modified ASTM C 611 method. Methylcyclohexane is employed in place of the heptane used in the standard test method. The method uses resin/aniline/methylcyclohexane in a ratio of 1/2/1 (5 g/10 ml/5 ml) and the cloud point is determined by cooling a heated, clear mixture of the three components until complete cloudiness is just established.

Regarding the determination of MMAP values, reference is further made to C. Donker, PSTC Annual Technical Seminar, Proceedings, pp. 149-164, May 2001.

Test VIII—Resins of Softening Temperature (Ring and Ball)

The tackifier resin softening temperature is determined according to the relevant methodology, which is known as ring & ball and is standardized according to ASTM E28.

Test IX—Melt Viscosity

To determine the melt viscosity of the plasticizing resins, a shear stress sweep is carried out in a shear rate-controlled DSR 200 N rheometer from Rheometrics Scientific, in rotation. A cone/plate measuring system with a diameter of 25 mm (cone angle 0.1002 rad) is employed; the measuring head is air-mounted and is suitable for standard force measurements. The gap is 0.053 mm and the measuring temperature is 25° C. The frequency is varied from 0.002 Hz to 200 Hz and the melt viscosity is recorded at 1 Hz.

EXAMPLES

The PSA of the invention is described hereinafter in preferred embodiment on the basis of a number of examples, without thereby wishing to subject the invention to any restriction whatsoever.

Furthermore, comparative examples are given, in which unsuitable adhesives are presented.

To produce the specimens, the raw materials needed in each case were weighed into a specimen glass and admixed with solvent. The solvent fraction was 60 wt % and the solvent composition was 15 parts of acetone, 30 parts of toluene and 55 parts of special-boiling-point spirit (boiling range 60° C. to 95° C.). Rotating the specimen glasses at 23° C. for 48 h produced a homogeneous solution. Where a colorant was used, the pigment was added to the solution and incorporated by dispersion in a high-speed dispenser of type Ultra-Turrax® from IKA for 15 min. This solution was coated onto a siliconized polyester film, using a laboratory coating bench, and then dried at 120° C. for 20 min, resulting in a layer of PSA 50 μm thick. This layer was either laminated with a further ply of a siliconized polyester film or with a ply of an etched polyester film 23 μm thick.

Raw Materials Used

Elastomer Component (a)

| | | Contribution to (a1) | Contribution to (a2) | Contribution to (a3) |
|---|---|---|---|---|
| Kraton D1118 (Kraton Polymers) | Linear poly-styrene-polybutadiene block copolymer | 78% | 22% | 0% |
| Kraton D1119 (Kraton Polymers) | Linear poly-styrene-polyisoprene block copolymer | 66% | 34% | 0% |
| Calprene C411 (Dynasol) | Radial poly-styrene-polybutadiene block copolymer | 20% | 80% | 0% |
| Kraton D1116 (Kraton Polymers) | Radial poly-styrene-polybutadiene block copolymer | 16% | 84% | 0% |
| Kraton D1101 (Kraton Polymers) | Linear poly-styrene-polybutadiene block copolymer | 16% | 84% | 0% |
| Kraton D1126 (Kraton Polymers) | Radial poly-styrene-polyisoprene block copolymer | 30% | 70% | 0% |
| Kraton D1102 (Kraton Polymers) | Linear poly-styrene-polybutadiene block copolymer | 17% | 0% | 83% |

(all % figures in wt %)

Resin Component (b)

| Dercolyte A115 | DRT | α-Pinene resin |
|---|---|---|
| Piccolyte A135 | Pinova | α-Pinene resin |
| Regalite R1125 | Eastman | Fully hydrogenated C9-hydrocarbon resin |

Plasticizing Resin Component (c)

| Piccolyte A25 | Pinova | Liquid terpene resin |
| --- | --- | --- |
| Wingtack 10 | Cray Valley | Liquid C5 hydrocarbon resin |

Further Constituents (d)

| Irganox 1010 | BASF SE | Primary antioxidant |
| --- | --- | --- |
| Irgafos 168 | BASF SE | Secondary antioxidant |
| Printex 25 | Orion Engineered Carbons | Pigmentary carbon black |

Inventive:

| | Example 1 | Example 2 | Example 3 | Example 4 | Example 5 | Example 6 | Example 7 | Example 8 | Example 9 |
| --- | --- | --- | --- | --- | --- | --- | --- | --- | --- |
| Kraton D1118 | 35.0% | 33.0% | 43.0% | 49.0% | 46.0% | 43.0% | 38.0% | 34.0% | 35.0% |
| Calprene C416 | | | | | | 15.0% | | 15.0% | 18.0% |
| Kraton D1116 | 11.0% | 27.0% | | 9.0% | 12.0% | | 20.0% | | |
| Kraton D1101 | | | 17.0% | | | | | | |
| Kraton D1102 | 14.0% | | | | | | | 5.0% | 10.0% |
| Dercolyte A115 | 34.0% | 37.0% | 37.0% | 37.0% | | 35.0% | 37.0% | 40.5% | |
| Piccolyte A135 | | | | | 37.0% | | | | 36.0% |
| Piccolyte A25 | | | | | | | 4.0% | 4.5% | |
| Wingtack 10 | 5.0% | 2.0% | 2.0% | 4.0% | 4.0% | 4.0% | | | |
| Irganox 1010 | 0.5% | 0.5% | 0.5% | 0.5% | 0.5% | 0.5% | 0.5% | 0.5% | 0.5% |
| Irgafos 168 | 0.5% | 0.5% | 0.5% | 0.5% | 0.5% | 0.5% | 0.5% | 0.5% | 0.5% |
| Printex 25 | | | | | | 2.0% | | | |
| Elastomer fraction (a)* | 60.0% | 60.0% | 60.0% | 58.0% | 58.0% | 58.0% | 58.0% | 54.0% | 63.0% |
| Fraction of (a2) in (a)* | 28.2% | 49.9% | 39.6% | 31.6% | 34.8% | 37.0% | 43.4% | 36.1% | 35.1% |
| Fraction of (a3) in (a)* | 19.4% | 0.0% | 0.0% | 0.0% | 0.0% | 0.0% | 0.0% | 7.7% | 13.2% |
| Ratio of (a) to [(b) + (c)]* | 1.54:1.00 | 1.54:1.00 | 1.54:1.00 | 1.41:1.00 | 1.41:1.00 | 1.49:1.00 | 1.41:1.00 | 1.20:1.00 | 1.75:1.00 |
| Fraction of (b) in [(b) + (c)]* | 87.2% | 94.9% | 94.9% | 90.2% | 90.2% | 89.7% | 90.2% | 90.0% | 100% |
| Peel adhesion [N/cm] | 5.8 | 6.6 | 8.8 | 8.1 | 7.9 | 7.7 | 7.1 | 8.0 | 5.2 |
| SAFT [° C.] | 144 | 149 | 140 | 139 | 140 | 142 | 145 | 137 | 152 |
| Ball Drop [cm] | >250 | >250 | >250 | 239 | 238 | 238 | 237 | 184 | >250 |

(% figures in wt %)
*values calculated from formulation details

Comparative:

| | Comparative 1 | Comparative 2 | Comparative 3 | Comparative 4 | Comparative 5 | Comparative 6 | Comparative 7 | Comparative 8 |
| --- | --- | --- | --- | --- | --- | --- | --- | --- |
| Kraton D1118 | 27.0% | 0.0% | 59.5% | 0.0% | 0.0% | 30.0% | | |
| Kraton D1119 | | | | | | | 20.0% | 35.0% |
| Kraton D1116 | 20.0% | 59.5% | | 25.0% | 43.0% | 2.0% | | |
| Kraton D1126 | | | | | | | 35.0% | 20.0% |
| Kraton D1102 | 2.0% | | | 15.0% | | 28.0% | | |
| Dercolyte A115 | 50.0% | 39.5% | 39.5% | 58.0% | 50.0% | 20.0% | | |
| Regalite R1125 | | | | | | | 42.0% | 42.0% |
| Wingtack 10 | | | | 1.0% | 6.0% | 19.0% | 2.0% | 2.0% |
| Irganox 1010 | 0.5% | 0.5% | 0.5% | 0.5% | 0.5% | 0.5% | 0.5% | 0.5% |
| Irgafos 168 | 0.5% | 0.5% | 0.5% | 0.5% | 0.5% | 0.5% | 0.5% | 0.5% |
| Elastomer fraction (a)* | 49.0% | 59.5% | 59.5% | 40.0% | 43.0% | 60.0% | 55.0% | 55.0% |
| Fraction of (a2) in (a)* | 46.4% | 84.0% | 22.0% | 52.5% | 84.0% | 14.0% | 56.9% | 47.1% |
| Fraction of (a3) in (a)* | 3.4% | 0.0% | 0.0% | 31.1% | 0.0% | 38.7% | 0.0% | 0.0% |
| Ratio of (a) to [(b) + (c)]* | 1.00:1.02 | 1.51:1.00 | 1.51:1.00 | 1.00:1.47 | 1.00:1.30 | 1.54:1.00 | 1.25:1.00 | 1.25:1.00 |
| Fraction of (b) in [(b) + (c)]* | 100.0% | 100.0% | 100.0% | 98.3% | 89.3% | 51.3% | 95.5% | 95.5% |
| Peel adhesion [N/cm] | 10.9 | 2.6 | 9.4 | 10.3 | 10.0 | 2.8 | 11.4 | 9.0 |
| SAFT [° C.] | 145 | 171 | 134 | 129 | 144 | 126 | 117 | 119 |
| Ball drop [cm] | 90 | 190 | 130 | 50 | 30 | 90 | 150 | 120 |

(% figures in wt %)
*values calculated from formulation details

The invention claimed is:

1. A block copolymer-containing pressure-sensitive adhesive comprising:
   a) 52 wt % to 65 wt %, of an elastomer component,
   b) 30 wt % to 45 wt %, of at least one tackifier resin,
   c) 0 wt % to 15 wt %, of at least one plasticizing resin, and
   d) 0 wt % to 18 wt %, of further additives,
      wherein the elastomer component (a) is at least 90 wt % of polyvinylaromatic-polybutadiene block copolymers, the polyvinylaromatic-polybutadiene block copolymers comprising at least one kind of a diblock copolymer (a1) and at least one kind of a triblock or multiblock copolymer (a2),
      the at least one diblock copolymer (a1) has a molar mass of at least 80 000 g/mol and a vinylaromatic fraction of 20 wt % to 40 wt % and has a vinylaromatic fraction of 15 wt % to 45 wt %, within the elastomer component (a) and,
      the fraction of triblock or multiblock copolymer (a2) is between 25 wt % and 50 wt %, and the triblock or multiblock copolymer (a2) has a molar mass of at least 125 000 g/mol and a vinylaromatic fraction of 15 wt % to 45 wt %, and
      optionally, the one kind of the triblock or multiblock copolymer (a2) is a multiarm (radial) block copolymer, and wherein;
      the adhesives exhibit a shock resistance of greater than or equal to 180 cm in a Ball Drop test and
      a peel adhesion on a steel substrate of at least 5 N/cm.

2. The block copolymer-containing pressure-sensitive adhesive of claim 1,
   wherein
   the at least one triblock or multiblock copolymer (a2), has a molar mass of at least 150 000 g/mol and/or a vinylaromatic fraction of 20 wt % to 40 wt %.

3. The block copolymer-containing pressure-sensitive adhesive of claim 1,
   wherein
   the elastomer component (a) additionally comprises a further polyvinylaromatic-polybutadiene block copolymer (a3) which in the crude state has a tensile strength of at least 25 MPa (according to ISO 37) and a molar mass of at most 120 000 g/mol,
   where the fraction of the block copolymer (a3) within the elastomer component (a) is at most 35 wt %.

4. The block copolymer-containing pressure-sensitive adhesive of claim 1,
   wherein
   the usage ratio of elastomer component (a) to resin component [(b)+(c)] is 1.20:1.00 to 2.00:1.00.

5. The block copolymer-containing pressure-sensitive adhesive of claim 1,
   wherein
   the usage ratio of tackifier resin component (b) in resin component [(b)+(c)] is at least 70 wt %.

6. The block copolymer-containing pressure-sensitive adhesive of claim 1,
   wherein
   the polybutadiene-polyvinylaromatic block copolymers are copolymers comprising polymer blocks predominantly formed from vinylaromatics (A blocks), and those predominantly formed by polymerization of 1,3-butadiene (B blocks).

7. The block copolymer-containing pressure-sensitive adhesive of claim 1,
   wherein
   the triblock or multiblock copolymer (a2) has the general structure A-B-A, $(A-B)_n$, $(A-B)_nX$ or $(A-B-A)_nX$,
   in which
      the blocks A independently of one another are a polymer formed by polymerization of at least one vinylaromatic;
      the blocks B independently of one another are a polymer formed by polymerization of butadiene, or are a partially hydrogenated derivative of such a polymer;
      X is the radical of a coupling reagent or initiator; and
      n is an integer $\geq 2$.

8. The block copolymer-containing pressure-sensitive adhesive of claim 1,
   wherein
   the triblock or multiblock copolymer (a2) has a radial architecture or is star-shaped or is linear.

9. The block copolymer-containing pressure-sensitive adhesive of claim 1,
   wherein
   the at least one tackifier resin has one or more of the following properties:
   (i) a weight-average molecular weight 500 to 5000 g/mol,
   (ii) an DACP (according to Test VI) of at least about +5° C.,
   (iii) an MMAP (according to Test VI) of at least about +50° C.,
   (iiii) a resin softening temperature (according to Test VIII) of at least about +90° C.

10. The block copolymer-containing pressure-sensitive adhesive of claim 1,
    wherein
    the at least one plasticizing resin has one or both of the following properties:
    a melt viscosity at 25° C. and 1 Hz of at least 25 Pa*s,
    a softening temperature of <25° C.

11. A pressure-sensitive adhesive strip devoid of permanent carrier comprising a pressure-sensitive adhesive of claim 1.

12. A pressure-sensitive adhesive strip, having a permanent carrier on which the pressure-sensitive adhesive of claim 1 has been applied on one or both sides of the permanent carrier.

13. An extensible permanent carrier comprising the pressure sensitive adhesive of claim 1.

14. An assembly composed of a pressure-sensitive adhesive strip of claim 11 and two components of a mobile device which are joined to the pressure-sensitive adhesive strip.

15. An assembly composed of a pressure-sensitive adhesive strip of claim 12, and two components of a mobile device which are joined to the pressure-sensitive adhesive strip.

16. The block copolymer-containing pressure-sensitive adhesive of claim 1, wherein
    the triblock or multiblock copolymer (a2) is a multiarm (radial) block copolymer.

17. The block copolymer-containing pressure-sensitive adhesive of claim 6, wherein
    the polybutadiene-polyvinylaromatic block copolymers are copolymers comprising polymer blocks predominantly formed from styrene (A blocks).

18. A block copolymer-containing pressure-sensitive adhesive comprising:
    a) 52 wt % to 65 wt %, of an elastomer component,
    b) 30 wt % to 45 wt %, of at least one tackifier resin, c) 0 wt % to 15 wt %, of at least one plasticizing resin, and
d) 0 wt % to 18 wt %, of further additives,
- wherein the elastomer component (a) is at least 90 wt % of polyvinylaromatic-polybutadiene block copolymers, the polyvinylaromatic-polybutadiene block copolymers comprising at least one kind of a diblock copolymer (a1) and at least one kind of a triblock or multiblock copolymer (a2), and the elastomer component (a) additionally comprises a further polyvinylaromatic-polybutadiene block copolymer (a3) which in the crude state has a tensile strength of at least 25 MPa (according to ISO 37) and a molar mass of at most 120 000 g/mol, where the fraction of the block copolymer (a3) within the elastomer component (a) is at most 35 wt %, the at least one diblock copolymer (a1) has a vinylaromatic fraction of 15 wt % to 45 wt %, within the elastomer component (a) the fraction of triblock or multiblock copolymer (a2) is between 25 wt % and 50 wt %, the triblock or multiblock copolymer (a2) has a molar mass of at least 125 000 g/mol and a vinylaromatic fraction of 15 wt % to 45 wt %, and optionally, the one kind of the triblock or multiblock copolymer (a2) is a multiarm (radial) block copolymer.

* * * * *